Aug. 9, 1955     H. MEULIEN ET AL     2,714,879
VALVE MEANS FOR TWO STROKE CYCLE INTERNAL COMBUSTION ENGINES
Filed Aug. 1, 1951     4 Sheets-Sheet 1
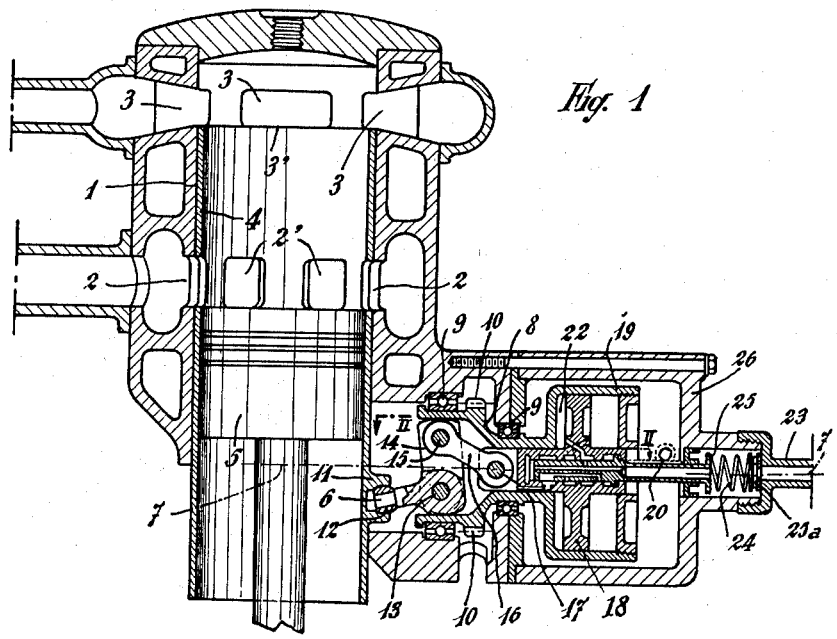
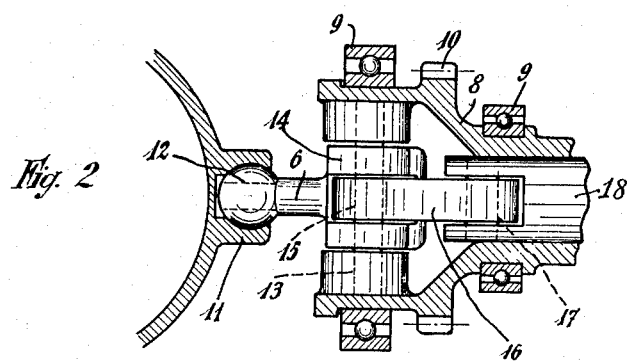
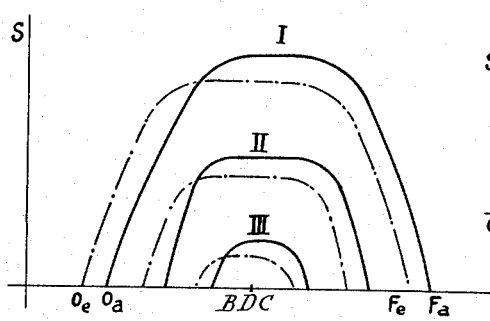
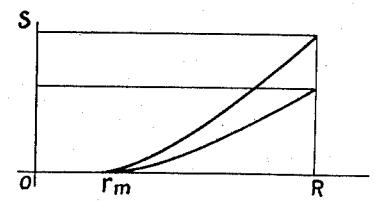
INVENTORS
Henri Meulien
& Jean Bertin
By Watson, Cole, Grindle & Watson

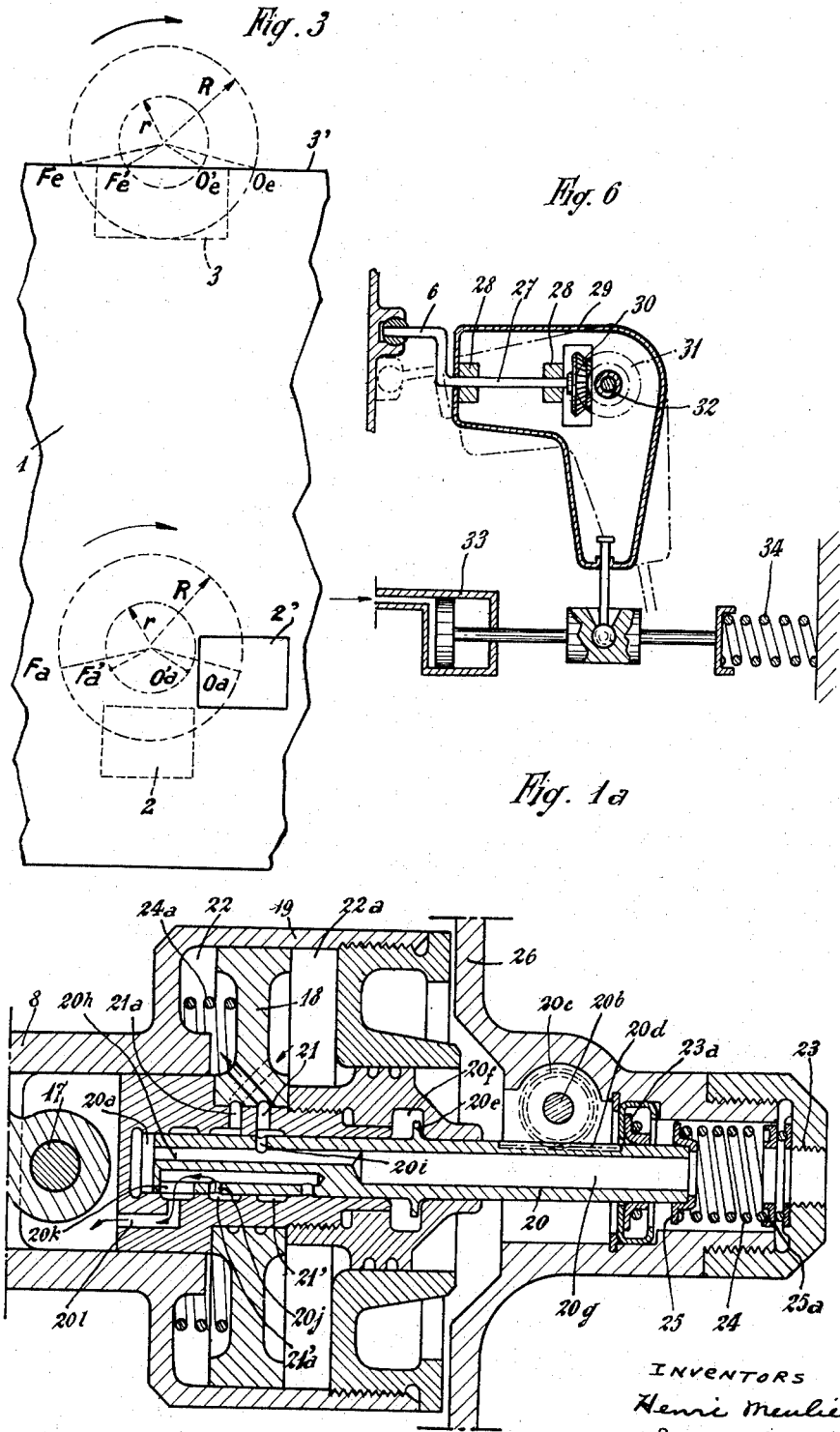

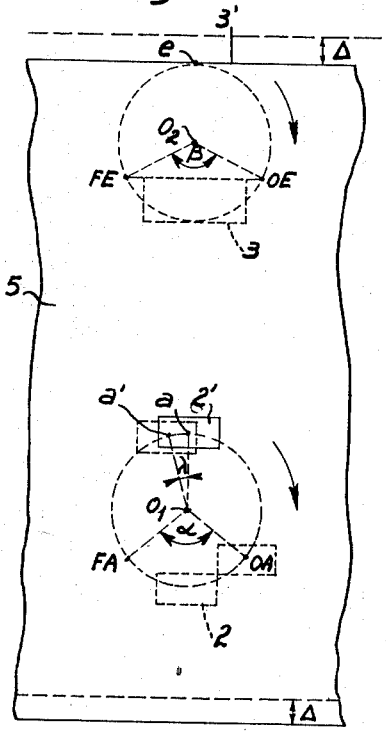
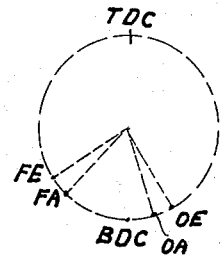
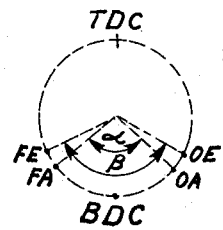
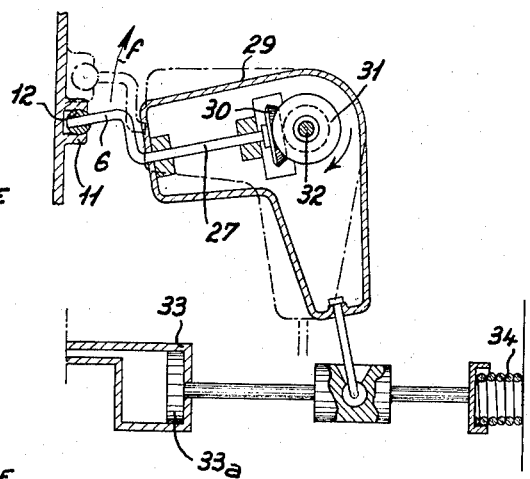
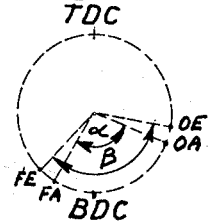

United States Patent Office 2,714,879
Patented Aug. 9, 1955

2,714,879

VALVE MEANS FOR TWO STROKE CYCLE INTERNAL COMBUSTION ENGINES

Henri Meulien, Courbevoie, and Jean Bertin, Neuilly-sur-Seine, France, assignors to Societe Nationale d'Etude et de Construction de Moteurs d'Aviation, Paris, France, a company of France Application August 1, 1951, Serial No. 239,688

Claims priority, application France August 19, 1950

9 Claims. (Cl. 123—65)

Two-stroke engines known at present are very suitable as regards power and efficiency, but on the other hand they have a few serious defects which cause them to be turned down from any important application.

One of these defects lies in the fact that the transfer of gases (suction, scavenging of burnt gases, exhaust) must take place within too short a time for completion, this entailing filling losses and poor efficiency.

Another serious drawback of two-stroke engines lies in the difficulty of adjusting their output.

In the method adopted for small motorcycle and light-car engines operating with pre-compression in the crank casing, the inlet to the carburetor is throttled, while the cylinder ports are allowed to open normally; however in this case scavenging and ignition take place irregularly and the engine operates in a very unpleasant, jerky manner.

The present invention has for its object to provide an improvement which enables the power to be correctly adjusted, within the limits usually prescribed for engines driving variable loads, such as for instance vehicle engines, and which promotes regular operation at the various rates of the engine.

This construction allows of keeping, at any running rate or load, the scavenging pressure at a substantially constant value, or at least it does not bring about variation thereof, and not only is the amount of air sucked into the cylinder at each stroke reduced but the amount of exhaust gas issuing from the cylinder is also reduced in a similar proportion.

With this improved engine, scavenging takes place regularly, and it is only the amounts of gases brought into action which vary. There is no longer any risk of a large quantity of fresh gas flowing out during exhaust, at low rates, i. e. at reduced loads, thus entailing a corresponding loss in efficiency.

A further advantage is that the amount of gas remaining inside the cylinder at each stroke is accurately determined and ignitions occur regularly.

Acceleration can be effected very readily, which is very important in the case of land vehicle engines. Indeed, besides the fact that this two-stroke cycle gives, for the same number of cylinders, a more constant torque than that of a four-stroke cycle, the keeping of the scavenging pressure at the same level at full load allows of increasing the work performed per stroke, as soon as the valve-gear opens. There is no lag: the increase in torque and in engine speed is instantaneous. The application of the invention is particularly convenient with valve-gears comprising movable sleeves controlling the ports of the cylinder, since, in this case, not only can the simultaneous adjustment of the effective inlet and exhaust passage areas be achieved in a particularly simple way, but furthermore it is possible to have, at full load, large passage areas allowing a rapid flow of gases.

The timing adjusting device of the invention can be applied to any two-stroke engine, with or without compressor.

It is particularly suitable for engines provided with a carburetor since, owing to the adjustment of the size of the exhaust ports, the carbureted air sucked into the cylinder has less tendency, at low loads, to flow out through the exhaust port, to the detriment of efficiency. At high loads, when the ports are wide open, there is a risk of wasting carbureted mixture; however, this is not a drawback in the case of engines whose mean load factor remains moderate, such as motor-car engines.

At low loads, the ports are opened later than at high loads. Hence the compression and expansion volumetric ratios, i. e. the ratios of the volumes at the beginning and end of the compression stroke and the expansion stroke respectively, are increased at low loads. Thus, efficiency is improved at partial loads without fear of detonations. It is easy to achieve an adjustment such that exhaust occurs 80° before the bottom dead center and closes 80° after, for high loads, with the same volumetric ratios for the compression stroke and the expansion stroke, this ratio being for instance of the magnitude of 8: but, at low loads, it occurs 53° before the bottom dead center and closes 50° after, with equal volumetric ratios for the compression and the expansion strokes of the magnitude of 11.2.

Obviously, the above device can also be applied to any fuel injection engine. In practice injection takes place after closure of the ports and efficiency remains good, even at partial loads, contrarily to what happens in conventional two-stroke engines.

In the case of diesel engines, the device allows of easily relating power or driving torque to efficiency, while keeping an adequate compression pressure. Indeed, compression and expansion can be very large at low loads and very small at high loads, since the device can be designed in such a way that, at low loads, the ports open soon before bottom dead center and close soon after, whereas at high loads, the ports open long before bottom dead center and close long after. Starting will be easy in the position of the timing-gear corresponding to idle running and the latter will itself be stable.

This invention may best be further described by reference to the accompanying drawings, which illustrate embodiments thereof and in which:

Figure 1 is a diagrammatic section, along a plane passing through the axis of a cylinder, of a valve-gear of a two-stroke engine according to the invention;

Figure 1a is a detail view, on a larger scale, of an oil servo-motor belonging to the device of Figure 1;

Figure 2 is on a larger scale, a fragmentary view of Figure 1, taken along line II—II;

Figure 3 is a partial development of the sleeve of the valve-gear showing the inlet and exhaust ports;

Figures 4 and 5 show graphs illustrating the operation;

Figure 6 is a diagrammatic view of another embodiment of the device of Figures 1 and 2;

Figure 7 shows the embodiment of Figure 6 in a different position;

Figure 8 is a diagram of partial development of the valve-gear sleeve showing the inlet and exhaust ports;

Figures 9 and 10 are two circular diagrams of operation of the valve-gear at high loads and correspond to different settings of the control device of the sleeve relatively to the crankshaft of the engine;

Figure 11 is a circular diagram illustrating the periods at low-load timing;

Figure 12:
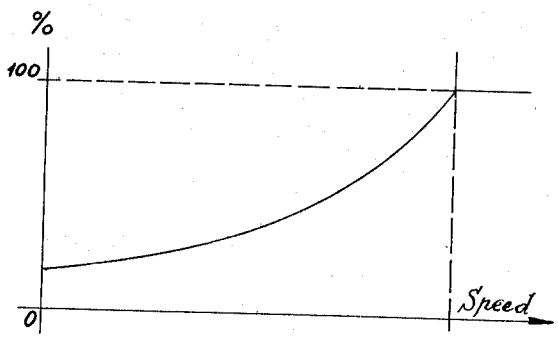
Figure 13:
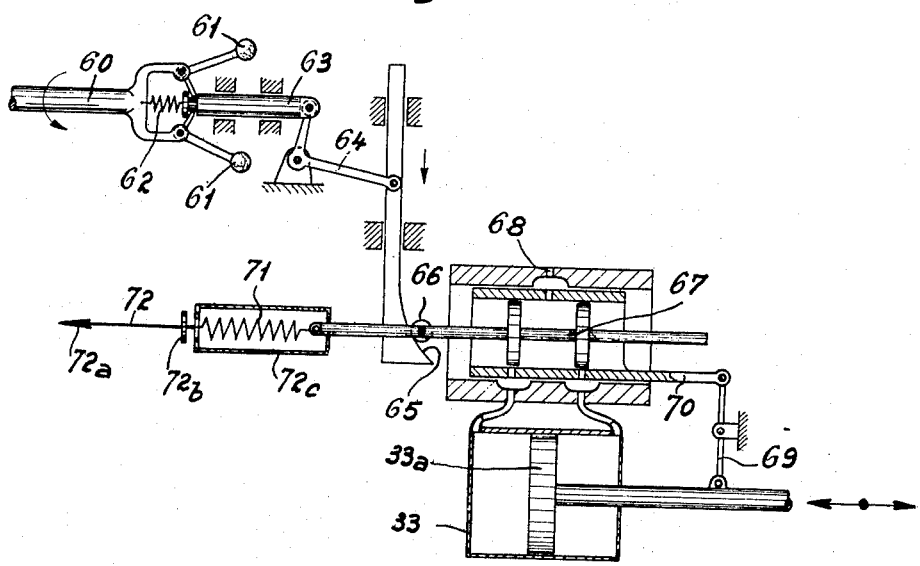

Figure 12 is a graph illustrating the variations of the surface of the ports in terms of the R. P. M. of the engine; and Figure 13 is a diagram of an embodiment of the device allowing of automatically achieving a variation according to Figure 12 by limiting the opening of the ports according to the engine speed.

In Figure 1, 1 is the wall of a cylinder of a two-stroke engine having at its lower part, inlet ports 2, and at its upper part exhaust ports 3, these ports being preferably distributed all around the cylinder. Inside the latter, there is fitted a sleeve 4 comprising ports 2' which can register with the ports 2 for the intake of scavenging and combustion air and which, on the contrary, can move away from these ports during compression, explosion and expansion. This sleeve 4 further controls the exhaust ports 3 through the agency of its upper rim 3'. A piston 5 slides inside said sleeve. The arrangement of the inlet ports at the lower part of the cylinder and of the exhaust ports at its top part is suitable insofar as the transfer of gases in the cylinder between the inlet and exhaust ports occurs in the same direction as that of the piston, at the beginning of its upstroke. The co-operation of the ports 2' of the sleeve with the ports 2 of the cylinder is obtained by movement such that every point of the sleeve has a reciprocating component parallel to the axis of the cylinder as well as an oscillatory component about this axis. This movement is controlled by a crank-pin 6 rotating about an axis 7—7. This pin is slidingly engaged into a ball-joint 12 located in a hollow protrusion 11 whose inner surface is spherical and which is integral with the sleeve. It is carried by a socket 8 journalled in ball bearings 9 whose axis is 7—7, the said socket being rotated about this axis at a speed equal to that of the crankshaft of the engine, by means of a transmission (not shown) which cooperates with a toothed ring 10 integral with said socket.

If the sleeve 4 is developed and if R is the radius of eccentricity of pin 6 relatively to the axis 7—7, every point of the sleeve describes a circle of radius R in the course of a revolution of the crank-shaft. During this circular movement, the ports 2' and the rim 3' of the sleeve uncover the full surface of the corresponding ports 2 and 3 of the cylinder, this corresponding to the full load of the engine.

If now the radius of the circle described around 7—7 by the operative end of the crank-pin 6 is reduced for instance, by means of the device described hereafter, the ports 2 and 3 of the cylinder will only be partly uncovered in the course of a revolution and moreover the angle through which the crankshaft rotates to move the sleeve between opening and closing position will be smaller.

This is shown in the diagram of Figure 3 in which it may be seen that, for the maximum radius R of the circle described by the crank-pin 6, the port 2' registers with the port 2 of the cylinder when the sleeve is at the bottom of its stroke, the upper rim 3' of the latter uncovering fully the exhaust ports 3. For a smaller radius r of the circle described by the crank-pin, the ports 2 and 2', will only register over a part of their height, the upper rim 3' of the sleeve also uncovering only a part of the height of the exhaust port 3.

It may further be seen that, if the beginning of suction corresponds to point Oa of the path of radius R of the pin and the end of suction to the point Fa, these points are transferred to O'a and F'a making a smaller angle when the radius of the crank-pin is reduced to r, the same result occurring as regards the exhaust port 3.

Figure 3 is merely diagrammatic and it is easy, for instance by conveniently disposing the inlet port 2' on the sleeve, to obtain the desired legs between the beginning of suction and exhaust and their end.

In the graphs of Fig. 4, the rotation angles of the crank-shaft are represented by the abscissae and the uncovered areas of the ports in the course of a cycle by the ordinates. The curves in full line correspond to the inlet ports and the curves in dot-and-dash line to the exhaust ports. BDC indicates the bottom dead center of the piston.

The first group I of curves corresponds to the maximum radius of the circle described by the end of the crank-pin, the groups II and III to two smaller values of the radius. In the grap of Figure 5 the uncovered areas of the inlet and exhaust ports are represented by the ordinates and the abscissae represent the corresponding radii of the crank-pin 6 between the minimum value $r_m$ and the maximum value R.

The device for bringing about such a variation in the radius of the circle described by the crank-pin 6 is constituted as follows (see Figures 1, 1a and 2).

The pin 6 is pivotally fitted on an axle 13 carried by the socket 8 perpendicularly to the axis 7—7. This pin comprises a fork-shaped portion 14 provided with two eyes opposite to one another and at 90° with the stem 6 of the crank-pin and carrying an axle 15 to which one end of a rod 16 is hinged, this rod 16 being hinged at its other end to an axle 17 fast with a double-action piston 18. This piston can slide in a cylinder 19 integral with the socket 8. A cylindrical slide-valve 20 is slidably mounted in an axial compartment 20a of the hub of the piston 18, the translatory displacement of this slide-valve relatively to the piston being controlled by the rotation of a shaft 20b carrying a pinion 20c in mesh with a rack 20d integral with the slide-valve 20. The displacements of the latter relatively to the piston 18 are limited by a protruding stop 20e integral with the said slide-valve and located, with a certain clearance, in a recess 20f of the hub of piston 18.

Oil under pressure supplied by a source not shown, is fed to a bore 20g of the slide-valve 20 through a nozzle 23 located on the stationary casing 26 which contains the ball bearing 9 journalling the socket 8 of the cylinder 19 and the piston 18. A fluidtight joint is disposed at 23a between the outer surface of the slide-valve 20 and the inner surface of the casing 26 for preventing oil entering at 23 from spilling into the casing 26.

The oil under pressure supplied to the slide-valve 20 flows through a duct 20h provided with a port 20i which, according to the position of the slide-valve 20, registers either with an annular groove 21' of the hub connected to a chamber 22 of the cylinder 19 through a duct 21, or with another annular groove 21'a connected to a chamber 22a of the said cylinder through a duct 21a, or else this port is obturated by the portion of the wall of the hub between the said ducts 21—21a (equilibrium position of Figure 1). In the position shown in Figure 1a, the port 20i of the slide-valve 20 registers with the groove of the duct 21 and oil under pressure flowing into the chamber 22 urges the piston 18 toward the right, so that the crank-pin 6, through the agency of the rod 16, is driven back toward the axis of rotation 7—7, the crank-pin radius thus decreasing. The opposite chamber 22a of the cylinder 19 is connected to exhaust through the duct 21a, its circular groove 21'a, the slide-valve ports 20j—20k, and the duct 20b through which oil can flow into the mechanism, thus lubricating the latter.

Inversely, if the slide-valve 20 is displaced relatively to the piston 18 towards the left of the drawing by rotating the shaft 20b, the port 20i registers with the groove of the duct 21a, so that oil under pressure flows into the chamber 22a of the cylinder 19. The chamber 22 being connected to exhaust through the duct 21, the circular groove 21', the port 20k, and the duct 20l, the piston 18 is urged toward the left of the drawing. The piston acting on the rod 16 drives the crank-pin 6 away from the axis 7—7, thus increasing the crank-pin radius.

A spring 24 acting between the stem 25 of the slide-valve 20 and a ring 25a carried on the casing 26, urges the slide-valve 20 toward the left.

The embodiment described above constitutes a servo-device for controlling the variations in radius of the crank-pin 6.

Between the piston 18 and the cylinder 19, a spring 24a can be inserted for automatically returning the piston 18 to the position corresponding to the smallest crank-pin radius, i. e. to idle running of the engine in case of failure of oil pressure.

In the embodiment shown in Figure 6, the value of the radius of the circle described by the crank-pin 6 and as a consequence the stroke of the sleeve remain constant, and the simultaneous variations of the maximum values of the effective flow areas of the inlet and exhaust ports is achieved by altering the means position of the sleeve 4 in the cylinder. The crank-pin 6 is fast with a spindle 27 journalled in convenient bearings 28 of a support 29. This spindle 27 is rotatingly driven by a bevel wheel 30 wedged thereto and meshing with another bevel wheel 31 whose shaft 32 is connected to the general gearing of the engine. The support 29 is pivotally mounted about the shaft 32 of the wheel 31. It is thus possible to rotate the support 29 about the shaft 32 without affecting the rotation of the crank-pin 6 and the circle described thereby, only the center of this circle and consequently the mean position of the sleeve 4 being displaced. The pivotal movement of the support 29 about the shaft 32 is controlled by an oil servo-motor 32 acting oppositely to a spring 34.

The top position of the sleeve 4 corresponding to one of the extreme positions of the support 29 has been shown in full line in the figure, and the top position of the sleeve corresponding to the other extreme position of said support 29 has been shown in dotted line.

In Figure 7, the device is shown in full line in the lower extreme position and in dotted line in the upper extreme position.

This device can bring about variations of the useful sections of the ports and of the adjustment of the valve-gear, similar to those provided by the previously described device. It is obviously possible, and even convenient, to use, instead of the single-action oil ram 33, a servo-motor similar to the one described with reference to Figures 1 and 1a.

In Figure 8, 2 indicates one of the inlet ports at the lower part of the cylinder, and 3 one of the exhaust ports at its top part. These ports, as described above, are controlled by the sleeve 5 (which is shown developed, as well as the ports). Thus, the reciprocatory translation motion of this sleeve is a vertical displacement in Figure 8, whereas the oscillatory motion about the axis of the cylinder is a horizontal displacement in this figure. The sleeve 5 has been shown in the position corresponding to the top dead center of its own movement. Its points are each assumed to describe a circular motion whose radius is that of the crank-pin (this radius is shown on an enlarged scale in Figure 8), although actually the motion of these points of the sleeve are not perfectly circular but rather oval.

It may be seen that the upper rim 3' of the sleeve becomes, after a rotation of 180° of each of its points, tangent to the lower rim of the exhaust port of the cylinder and similarly its ports 2' register with the ports 2 of the cylinder.

There is thus a moment at which the inlet and exhaust of the cylinder are entirely uncovered. OA, OE represent the position of the respective points $a$, $e$ of the sleeve, for which suction and exhaust begin. FA, FE represent the positions of these same points, $a$ and $e$ corresponding to the end of suction and exhaust. The angular values of the suction and exhaust periods therefore correspond to the angles $\alpha$ and $\beta$.

Assuming the movement of the sleeve to be in phase with that of the crank-shaft, both members reach at the same time their top dead center, and it is possible to draw the circular diagram of Figure 9 in which the beginnings and ends of the inlet and exhaust periods are symmetrical about the dead center line (this symmetry is not, however, compulsory). It is possible for instance that point $a$ which is the center of the ports 2' of the sleeve, be slightly shifted on its circle relatively to point $e$ (for example it may be located at $a'$ and rearwardly shifted through an angle $\lambda$).

If now the support 29 (Fig. 6), is pivoted in the direction of arrow $f$ of Figure 7, toward the position shown in dotted line, this movement causes the sleeve to rise in the cylinder through a certain distance $\Delta$. In these circumstances, the opening of the inlet ports 2 and the exhaust ports 3 of the cylinder will only be partial. Moreover, the values of the angles corresponding to the suction and exhaust periods become respectively smaller than $\alpha$ and $\beta$.

It is to be noted that in this embodiment in which the crank 6 is pivotally supported, the pivoting of the support 29 for adjusting the periods and the sections of the valve ports is necessarily accompanied by the rolling of the wheel 30 over the wheel 31 and, consequently, by a shifting of the crank-pin 6 relatively to the crank-shaft of the engine. Hence, if the periods are symmetrical about the dead center line in a position of the support 29, as shown in Figure 9, they are no longer so in any other position. Examples of such other positions at high and low loads respectively are shown in Figures 10 and 11.

It is thus possible to alter the relative values of the volumetric ratios of the compression and expansion strokes, at high loads and at low ones, for instance to promote expansion at low loads and on the contrary compression at high loads.

In the graph of Figure 12 the abscissae represent the speed of the engine and the ordinates the opening of the valve-gear ports (given as a percentage of the maximum opening area) providing for the full scavenging of the cylinders without giving rise to important losses of gas. At reduced speeds, the convenient opening area is only a small percentage of the total possible area. This total area can be provided at the maximum rotation speed at which the maximum torque can be maintained.

By means of a device bringing the sleeve valve-gear under control of the engine speed, such a relation can be automatically achieved, or at any rate, for each engine speed a maximum can be imparted to the amount by which the driver acting on the throttle-control lever can increase the maximum effective areas of the inlet and exhaust ports.

The embodiment shown in Figure 13 corresponds to the method of control of the sleeve which has been described with reference to Figure 6, but it could obviously be altered easily in order to suit the embodiments of Figures 1 and 2.

A shaft 60 driven by the engine carries governor fly-balls 61 which act, oppositely to a spring 62, on a sliding rod 63. The latter controls, through a bent lever 64, the translation of a cam 65 whose outline corresponds to the equation relating the speed to the maximum desirable opening of the valve-gear ports. A roller 66 carried by the rod of a slide-valve 67, presses against this cam 65. Oil under pressure is fed at 68 to this slide-valve and, according to position of the latter, forwards the oil on one or the other faces of the piston 33a inside cylinder 33. The rod of this piston can be linked to the pivoted support of the pin controlling the sleeve, as described with reference to Figure 6 (in which the said support is shown at 29). The position of the piston 33a is related to that of the slide-valve 67 by means of the follow-up lever 69 connecting this piston to the sleeve 70 in which the slide-valve 67 moves.

The latter is connected to the throttle-control lever or pedal through a spring 71 and an appropriate linkage 72.

This arrangement operates as follows:

In order to increase the effective section of the valve-gear ports, the driver must pull the rod 72, by acting on the throttle lever, in the direction of the arrow 72a. The cam 65 limits the displacement of the slide-valve 67, the more so as speed is lower. The spring 71 absorbs the excess of the stroke of the throttle lever.

In the opposite direction, a stop 72b abuts against the

What we claim is:

1. A two-stroke internal combustion engine having an inlet passage and an exhaust passage, comprising inlet and exhaust valve means for controlling said passages, each valve means being movable from a closing position to an adjustable maximum opening position, means for imparting to said valve means a combined reciprocatory and oscillatory motion with stroke ends corresponding respectively to said closing position and to said maximum opening positions, and means for adjusting said stroke ends, whereby the maximum values of the effective flow areas of said inlet and exhaust passages are simultaneously varied.

2. A two-stroke engine according to claim 1, wherein the inlet and exhaust passages of the engine terminate in ports and the inlet and exhaust valve means controlling said ports are constituted by a sleeve driven by a crank-pin, between said closing positions and said extreme opening positions, the rotation of said crank-pin imparting to said sleeve a motion having a reciprocating component parallel to the axis thereof and an oscillatory component about said axis.

3. A two-stroke engine according to claim 2, wherein the extreme positions of the sleeve are adjusted by means for varying the eccentricity of said crank-pin.

4. A two-stroke engine according to claim 2, wherein the extreme positions of the sleeve are adjusted by means for varying the axis of rotation of said crank-pin.

5. A two-stroke internal combustion engine having inlet ports and exhaust ports, comprising a sleeve adapted to control said ports and movable from closing positions to extreme opening positions wherein said ports are opened to a maximum value of the effective flow areas thereof, a crank-pin associated with said sleeve for driving same between said closing positions and said extreme opening positions, the rotation of said crank-pin imparting to said sleeve a motion having a reciprocating component parallel to the axis thereof and an oscillatory component about said axis, said crank-pin being mounted on a pivot the axis of which is perpendicular to the rotation axis, and control means for adjusting the position of said crank-pin about said pivot, whereby said maximum values of the effective flow areas of said ports are simultaneously varied.

6. A two-stroke engine according to claim 5 in which the control means is constituted by an oil ram connected through a rod to the crank-pin and located in a rotary socket carrying said crank-pin.

7. A two-stroke engine according to claim 5 in which the control means is constituted by a servo-motor actuated by oil under pressure comprising a double-action piston and a slide-valve associated with said piston and adapted to control the passage of oil to and from the chambers on either side of said piston.

8. A two-stroke engine according to claim 5 further comprising a return means for automatically urging the crank-pin to the position corresponding to idle running of the engine, in case of failure of oil pressure.

9. A two-stroke engine according to claim 5 in which the crank-pin is carried by a pivotal support, means being provided for pivotally controlling said support.

References Cited in the file of this patent

UNITED STATES PATENTS

| | | |
|---|---|---|
| 1,140,394 | Pringle | May 25, 1915 |
| 1,630,245 | Haltenberger | May 24, 1927 |
| 1,669,780 | Ricardo | May 15, 1928 |
| 1,855,290 | Haltenberger | Apr. 26, 1932 |
| 2,197,107 | Kammer | Apr. 16, 1940 |
| 2,229,709 | Tisserant | Jan. 28, 1941 |

FOREIGN PATENTS

| | | |
|---|---|---|
| 2,466 | Great Britain | Feb. 2, 1909 |
| 493,727 | Great Britain | Oct. 13, 1938 |
| 514,286 | Germany | Dec. 10, 1930 |
| 628,245 | Germany | Mar. 30, 1936 |
| 50,888 | France | Jan. 9, 1941 |

(Addition to No. 855,408)